US008109692B2

(12) United States Patent
Welch et al.

(10) Patent No.: US 8,109,692 B2
(45) Date of Patent: Feb. 7, 2012

(54) BARRIER TRANSFER DEVICE, SYSTEM AND METHOD FOR THE USE THEREOF

(75) Inventors: James B. Welch, Placerville, CA (US); Douglas E. Wilkinson, Auburn, CA (US); Patrick A. Leonhardt, Rocklin, CA (US); Michael H. Oberth, Lincoln, CA (US); Barry D. Stephens, Roseville, CA (US); Sean Thompson, Sacramento, CA (US); Donald L. Crothers, Rocklin, CA (US)

(73) Assignee: Energy Absorption Systems, Inc., Dallas, TX (US)

( * ) Notice: Subject to any disclaimer, the term of this patent is extended or adjusted under 35 U.S.C. 154(b) by 603 days.

(21) Appl. No.: 12/231,007

(22) Filed: Aug. 28, 2008

(65) Prior Publication Data

US 2009/0074507 A1 Mar. 19, 2009

Related U.S. Application Data

(60) Provisional application No. 61/011,954, filed on Jan. 23, 2008, provisional application No. 60/967,649, filed on Sep. 6, 2007.

(51) Int. Cl.
*B60P 3/40* (2006.01)

(52) U.S. Cl. .......... 404/86; 404/73; 414/460; 414/749.6

(58) Field of Classification Search ................ 404/6, 73, 404/83, 85, 86; 414/749.1, 749.6, 460, 461
See application file for complete search history.

(56) References Cited

U.S. PATENT DOCUMENTS 2,182,697 A 12/1939 Jelinek
2,287,685 A 6/1942 Jelinek
2,931,279 A 4/1960 Wiswell
4,017,200 A 4/1977 Woods, Jr.
4,119,210 A 10/1978 Desourdy
4,167,826 A 9/1979 Feliz
(Continued)

FOREIGN PATENT DOCUMENTS

DE 1948 051 4/1971
(Continued)

OTHER PUBLICATIONS

International Preliminary Report on Patentability for International Application No. PCT/US2008/074565, dated Mar. 18, 2010, 8 pages.

(Continued)

*Primary Examiner* — Gary S Hartmann
(74) *Attorney, Agent, or Firm* — Brinks Hofer Gilson & Lione

(57) ABSTRACT

A barrier transfer device includes a cantilevered support arm and a carriage coupled to the support arm. The carriage includes at least a pair of barrier interface members extending downwardly from the support arm. The barrier interface members are configured to engage a barrier on opposite sides thereof when the barrier. A system for transferring a barrier includes a transfer vehicle having an outermost portion on each of first and second opposite sides of the transfer vehicle. The cantilevered support arm is coupled to the transfer vehicle and extends laterally outwardly past the outermost portion of the transfer vehicle on the first side of the transfer vehicle. A moveable barrier system includes at least one barrier having first and second sides and a bottom adapted to be supported by a ground surface and a transfer vehicle having a barrier interface element engaging only a first side of said barrier. Methods for transferring a barrier are also provided.

25 Claims, 9 Drawing Sheets

U.S. PATENT DOCUMENTS

| | | | |
|---|---|---|---|
| 4,474,503 | A | 10/1984 | Booth |
| 4,498,803 | A | 2/1985 | Quittner |
| 4,500,225 | A | 2/1985 | Quittner |
| 4,624,601 | A | 11/1986 | Quittner |
| 4,632,598 | A | 12/1986 | Richards |
| 4,653,954 | A | 3/1987 | Booth et al. |
| 4,666,332 | A | 5/1987 | Burgett |
| 4,806,044 | A | 2/1989 | Duckett |
| 4,815,889 | A | 3/1989 | Duckett |
| 4,828,425 | A | 5/1989 | Duckett |
| 4,881,845 | A | 11/1989 | McKay |
| 4,955,753 | A | 9/1990 | McKay |
| 5,007,763 | A | 4/1991 | Burgett |
| 5,033,905 | A | 7/1991 | Schmidt et al. |
| 5,074,704 | A | 12/1991 | McKay |
| 5,088,874 | A | 2/1992 | Quittner |
| 5,246,305 | A | 9/1993 | Peek |
| 5,253,951 | A | 10/1993 | Peek |
| 5,403,114 | A | 4/1995 | James |
| 5,632,590 | A | 5/1997 | Pearson et al. |
| 5,688,071 | A | 11/1997 | Owen |
| 5,720,572 | A | 2/1998 | Richer |
| 5,885,046 | A | 3/1999 | Peek et al. |
| 6,022,168 | A | 2/2000 | Junker |
| 6,220,780 | B1 | 4/2001 | Schindler et al. |
| 6,413,009 | B1 | 7/2002 | Duckett |
| 6,439,802 | B1 | 8/2002 | Duckett |
| 6,832,870 | B1 | 12/2004 | Krivoy |
| 6,984,088 | B1 | 1/2006 | Krivoy |
| 7,354,218 | B1 | 4/2008 | Dyke et al. |
| 2006/0239809 | A1 | 10/2006 | DeSilvio |

FOREIGN PATENT DOCUMENTS

| | | |
|---|---|---|
| EP | 0 209 309 A2 | 1/1987 |
| EP | 0 429 165 B1 | 12/1993 |
| EP | 0 605 976 B1 | 1/1997 |
| WO | WO 99/27190 | 6/1999 |
| WO | WO 2005/085533 | 9/2005 |

OTHER PUBLICATIONS

Bligh, P.E., Texas Transportation Institute—The Texas A&M University System, College Station, Texas, "Project Summary Report 0-4692-S: Short Portable Concrete Barrier Simplifies Maintenance Operations," Aug. 2006, 4 pages.

Texas Transportation Institute—The Texas A&M University System, College Station, Texas, Draft of "Development of Functional Requirements for a Highly-Mobile Barrier System to Protect Highway Workers: Interim Report," May 2004, 44 pages.

Sicking, Dean L., Ross, Jr., Hayes E., Ivey, D.L., and Hirsch, T.J., "Portable Traffic Barrier for Work Zones," Transportation Research Record 942, date unknown, pp. 25-31.

Glauz Doran L., "Transportation Research Record 1258: Performance Evaluation of a Movable Concrete Barrier," date unknown, pp. 92-106.

Brochure, Vario-Guard, "The mobile steel protective wall for increased safety," Safe German Guardrail Technology GmbH, Ottweiler, Germany, date unknown, 6 pages.

Brochure, Mini-Guard, "The mobile steel protective wall for increased safety," Safe German Guardrail Technology GmbH, Ottweiler, Germany, date unknown, 6 pages.

Volkmann-Rossbach, Mini-Guard, "Positioning technique to prevent traffic jams," [online] [retrieved from internet: URL http://www.volkmann-rossbach.com/miniguard_positioning_technique.html], [retrieved on Jan. 21, 2008], 2 pages.

"Un Nuovo Sistema Di Sicurezza Per Cantieri," In Contri, May 2007, pp. 311-314.

International Search Report and Written Opinion in International Application No. PCT/US2008/074565, dated Nov. 10, 2008, 12 pages.

BARRIER TRANSFER DEVICE, SYSTEM AND METHOD FOR THE USE THEREOF

This application claims the benefit of U.S. Provisional Application No. 61/011,954, filed Jan. 23, 2008, and U.S. Provisional Application No. 60/967,649, filed Sep. 6, 2007, the entire disclosures of which are hereby incorporated herein by reference.

FIELD OF THE INVENTION

The present invention relates generally to a barrier transfer device, and in particular, to a barrier transfer device supported entirely on one side of a barrier, along with a system and method for the use thereof.

BACKGROUND

Many roadways are experiencing increased congestion. At the same time, such roadways must be repaired, maintained and/or expanded to accommodate and facilitate safe traffic flow. The increased congestion, however, is exacerbated when one or more lanes of a roadway are closed for necessary road work. The increased congestion can increase the risk to highway workers performing the road work. Because of the increase in congestion caused by lane closures, and/or the risk to workers, many localities have eliminated road work during the peak rush hours, or further restricted such work to nights and/or weekends.

As a result, there is a need for work crews to close appropriate lanes during the work period and to reopen the lanes in the non-work period. This means that the lanes must be closed and opened quickly, so that the maximum number of hours is available to perform the necessary roadwork.

Typically, there are two types of products used to delineate lane closures. Positive protection devices, such as concrete barriers, steel barriers, plastic barriers, etc., provide positive crash protection to road workers working on the roadway. Typically, however, moving or positioning such devices can be difficult and time consuming due to their size, weight, connection and/or configurations. Non-positive protection devices, such as traffic cones, bollards and portable delineator posts, do not provide positive crash protection but can be quickly and easily deployed and retrieved.

For example, U.S. Pat. No. 6,220,780 to Schindler and U.S. Pat. No. 6,022,168 to Junker disclose systems for moving devices that do not provide positive crash protection. In both systems, the lane divider is fed into a conveyor by a pick-up blade or other device that engages a bottom surface of the lane divider. Such systems, however, are not suitable for a heavy concrete, steel or water-filled barrier.

Other devices have been developed for moving positive protection devices, as shown for example in U.S. Pat. No. 4,955,753 to McKay, U.S. Pat. No. 4,500,225 to Quittner, and U.S. Pat. No. 5,246,305 to Peek. These devices, however, suffer several deficiencies. For example, these devices are typically embodied in large transfer machines that are dedicated solely to the transfer of barriers, meaning they must be stored at already crowded work sites, or transported to and from the site as needed. In addition, they are costly and complex, yet serve only the limited function of moving barriers. Moreover, the devices are required to be supported by the ground on both sides of the barrier, meaning that they are exposed to vehicles on the traffic side of the barrier, which in turn exposes the operator to the very risks such barrier devices are intended to avoid. Moreover, the devices are typically configured to move the barriers a predetermined, set lateral distance, or a maximum or minimum such distance, which may not be optimum for a particular work-zone configuration. In addition, typical barrier movers position the operator/driver ahead of the barrier being moved, forcing the driver to use mirrors and/or cameras to observe the movement of the barrier. This also places the driver on the traffic side of the barrier, increasing the risk to the operator. Accordingly, there is a need for a device or system that can quickly and easily move or redeploy positive protection devices, yet is inexpensive, compact, easily stored and easily deployed.

SUMMARY

The present invention is defined by the following claims, and nothing in this section should be considered to be a limitation on those claims. By way of introduction, the embodiment of a barrier transfer device described below may be connected to any number of transfer vehicles. For example and without limitation, the barrier transfer device can be used with a skid-steer loader, tractor (e.g., backhoe and front-end loaders), power shovel, crane, truck (pick-up, dump, etc.), forklift, walk-behind tractor or other like construction equipment.

In one aspect, one embodiment of a barrier transfer device includes a vehicle interface component adapted to be mounted to a transfer vehicle and a cantilever support arm coupled to the interface. The cantilever support arm extends laterally outwardly in a first direction from the vehicle interface component. A carriage is coupled to the support arm. The carriage includes at least a pair of barrier interface members extending downwardly from the support arm. The barrier interface members are spaced apart in the first direction and define a barrier passageway therebetween. The barrier passageway has an inlet and an outlet, with the barrier passageway extending between the inlet and outlet in a second direction substantially perpendicular to the first direction. The barrier interface members are configured to engage a barrier on opposite sides thereof when the barrier is disposed in the barrier passageway.

In one embodiment, a barrier transfer device includes a cantilever support arm having a second portion pivotally connected to a first portion about a substantially vertical axis, wherein the second portion is pivotable relative to the first portion from a nominal position to a deflected position. At least one spring biases the second portion relative to the first portion from the deflected position toward the nominal position. A carriage is coupled to the second portion and includes at least a pair of barrier interface members configured to engage a barrier on opposite sides thereof.

In another aspect, a system for transferring a barrier includes a transfer vehicle having an outermost portion on each of first and second opposite sides of the transfer vehicle. A cantilever support arm is coupled to the transfer vehicle and extends laterally outwardly past the outermost portion of the transfer vehicle on the first side of the transfer vehicle. A carriage is coupled to the support arm and includes at least a pair of barrier interface members extending downwardly from the support arm. The barrier interface members are spaced apart and define a barrier passageway therebetween. The barrier passageway has an inlet and an outlet, with both the inlet and outlet positioned laterally outwardly of the outermost portion of the transfer vehicle on the first side of the transfer vehicle. The barrier interface members are configured to engage a barrier on opposite sides of the barrier as the barrier passes through the barrier passageway from the inlet to the outlet.

In another embodiment, a barrier transfer vehicle includes a barrier interface element that engages only a first side, whether work or traffic, of the barrier. For example, the barrier can be configured with a lip on at least the first side, with the interface element engaging the lip and laterally moving the barrier.

In yet another aspect, a method for transferring a barrier includes providing a barrier having first and second sides. The barrier includes a plurality of barrier modules connected end-to-end. The method includes driving a transfer vehicle along a path on the first side of the barrier, wherein the vehicle is supported entirely by a support surface on the first side of said barrier and is free of any engagement with the support surface on the second side of the barrier. The transfer vehicle includes a barrier transfer device having a support disposed above the barrier and a carriage coupled to the support. The method further includes sequentially engaging the plurality of barrier modules with the carriage, sequentially moving the plurality of barrier modules in a lateral direction with the carriage and sequentially releasing the plurality of barrier modules from the carriage.

In another aspect, the method includes sequentially engaging a plurality of barrier modules with a barrier interface element on only a first side of a barrier and sequentially moving the plurality of barrier modules in a lateral direction with the barrier interface element. In one embodiment, the barrier modules are lifted by way of engagement of the interface element with a lip, while in another embodiment, the interface element simply pushes the barrier modules, which maintain at least partial contact with the ground.

The various aspects and embodiments provide significant advantages. In particular, the barrier transfer device is relatively inexpensive and small in size. Accordingly, a large number of devices can be deployed simultaneously along a stretch of roadway, thereby further speeding the lane closure and opening. At the same time the devices can be easily stored on-site. The devices are easily mounted to a variety of construction equipment, which does not require special training or uniquely skilled operators. In addition, the transfer vehicle can be disposed entirely on the work-side of the traffic barrier. In this way, the operator is not exposed to the traffic hazards, and remains protected by the barrier, during lane closures or openings.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 1:
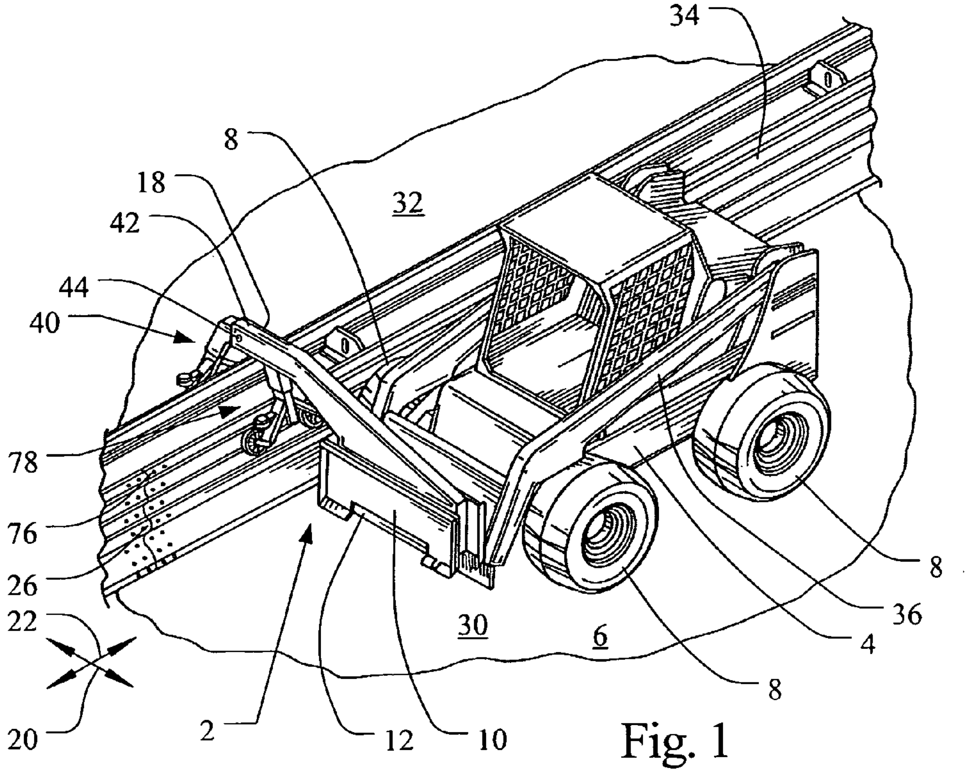
FIG. 1 is a work-side perspective view of one embodiment of a barrier transfer device coupled to a transfer vehicle and engaged with a barrier.
Figure 2:
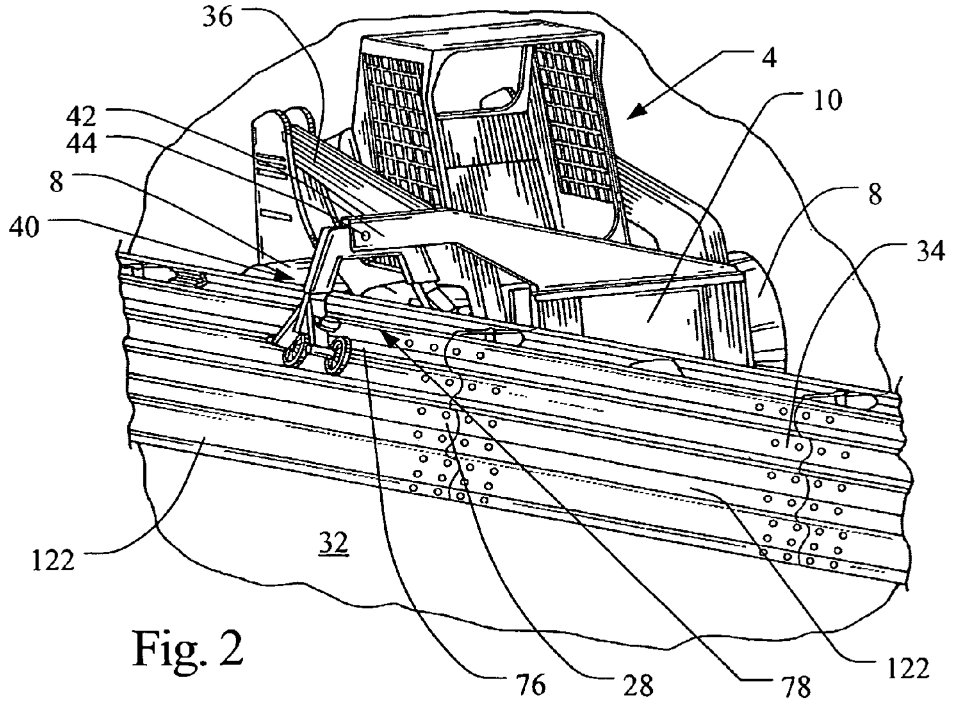
FIG. 2 is a traffic-side perspective view of the barrier transfer device, transfer vehicle and barrier shown in FIG. 1.
Figure 3:
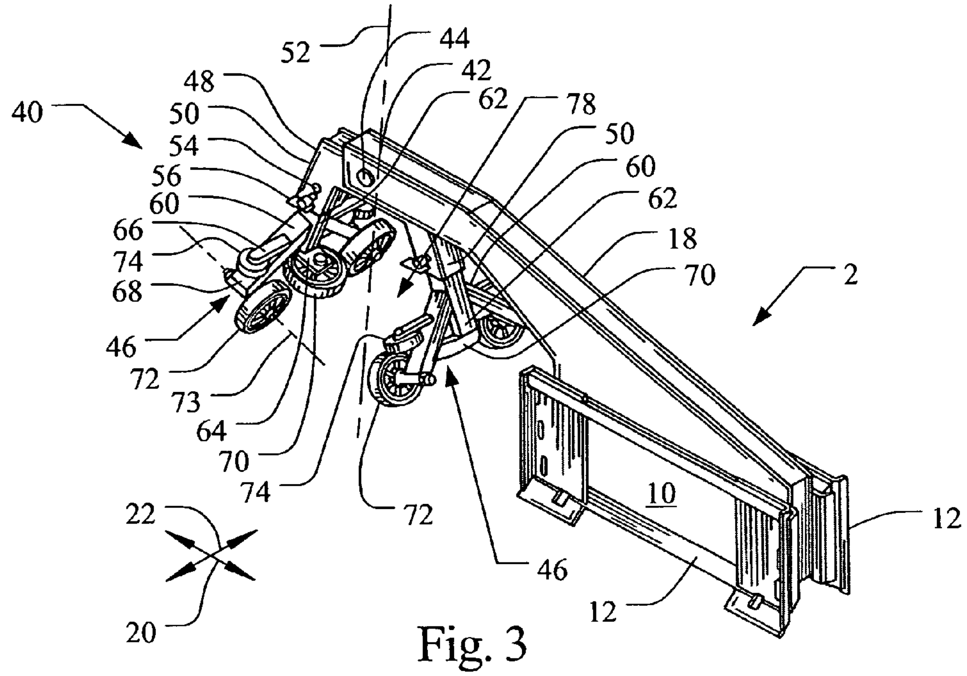
FIG. 3 is a perspective view of one embodiment of a barrier transfer device.

Referring to FIGS. 1-3, a barrier transfer device 2 is coupled to a transfer vehicle 4. In one embodiment, the transfer vehicle is a skid-steer loader, for example a Bobcat® skid-steer front end loader. It should be understood that the term "vehicle" refers to any self-propelled piece of equipment, and that the transfer vehicle can be any type of commonly available or specialty construction equipment, including without limitation a tractor (often configured with a backhoe and/or front end loader) (see FIGS. 4-6), power shovel, grader, crane, truck (pick-up, dump, etc.), forklift, walk-behind tractor or other like construction equipment. In this way, the transfer vehicle can serve a multiplicity of functions other than functioning only as a device for carrying and moving the barrier transfer device. Of course, the vehicle can also be specially configured to support a barrier transfer device and to move a barrier.

The transfer vehicle is provided with a propulsion system engaged with a "support surface" 6, which is understood to mean the ground and/or any surface capable of supporting the vehicle, including bridges, overpasses, parking lots, or other structures supported on or above the ground. In one embodiment, the propulsion system includes a plurality of wheels 8, shown as four. The term "plurality" as used herein means two or more. In other embodiments, the propulsion system includes caterpillar tracks, for example a pair of tracks disposed on opposite sides of the vehicle, other known systems, or combinations thereof, including for example a combination of wheels and tracks.

Figure 13:
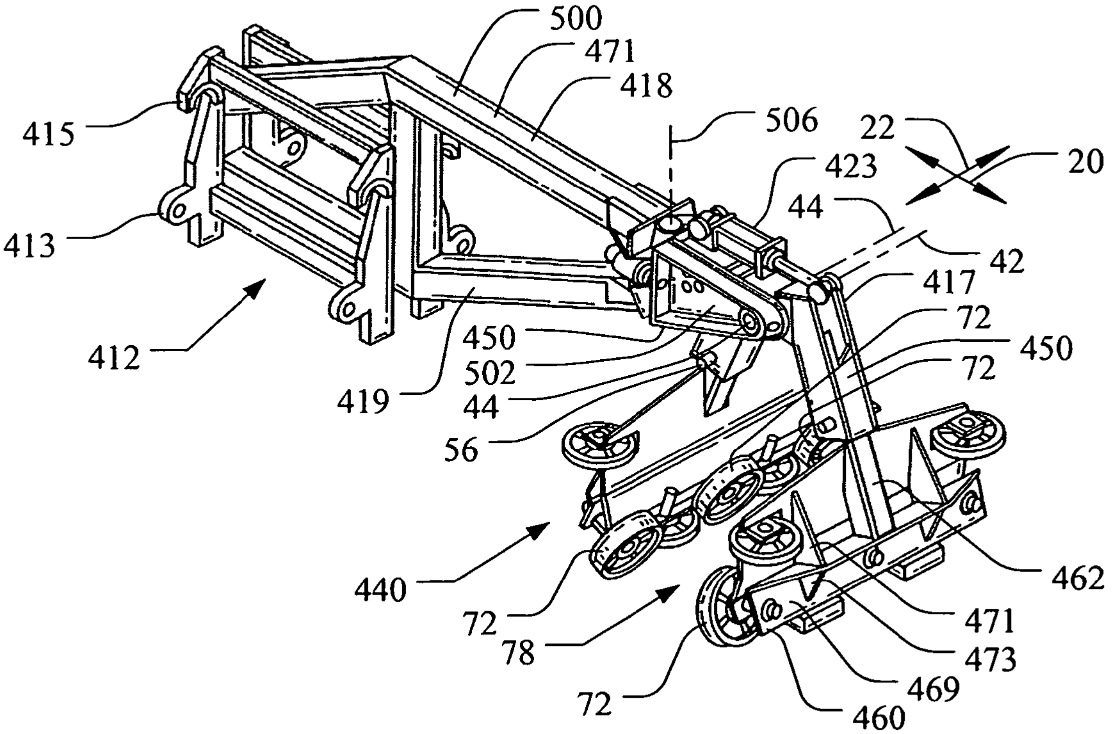
FIG. 13 is a perspective view of another embodiment of a barrier transfer device.
Figure 14:
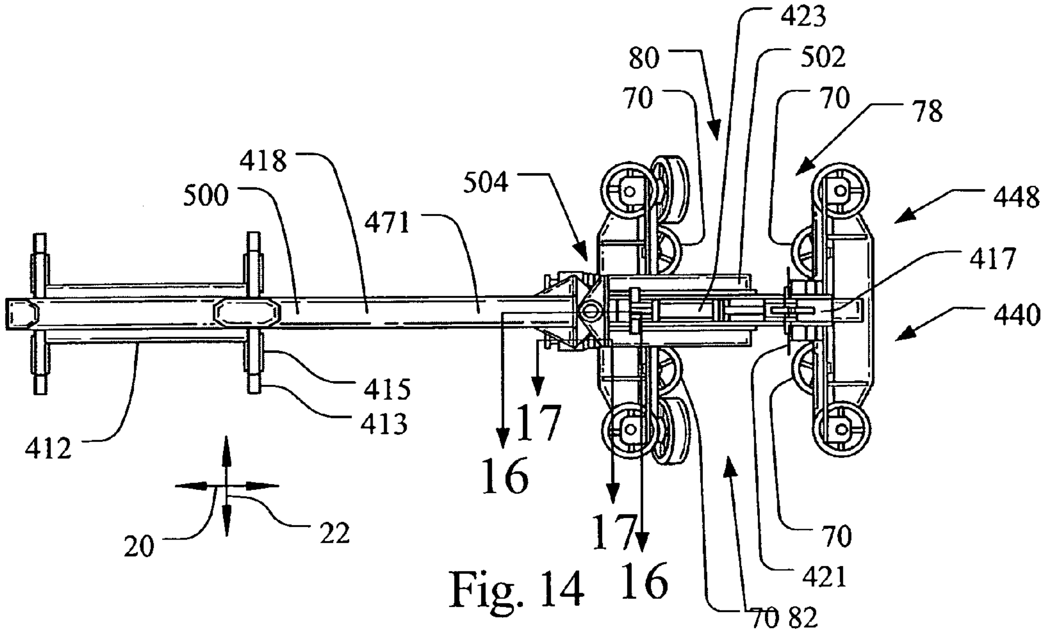
FIG. 14 is a top, plan view of the barrier transfer device shown in FIG. 13.
Figure 15:
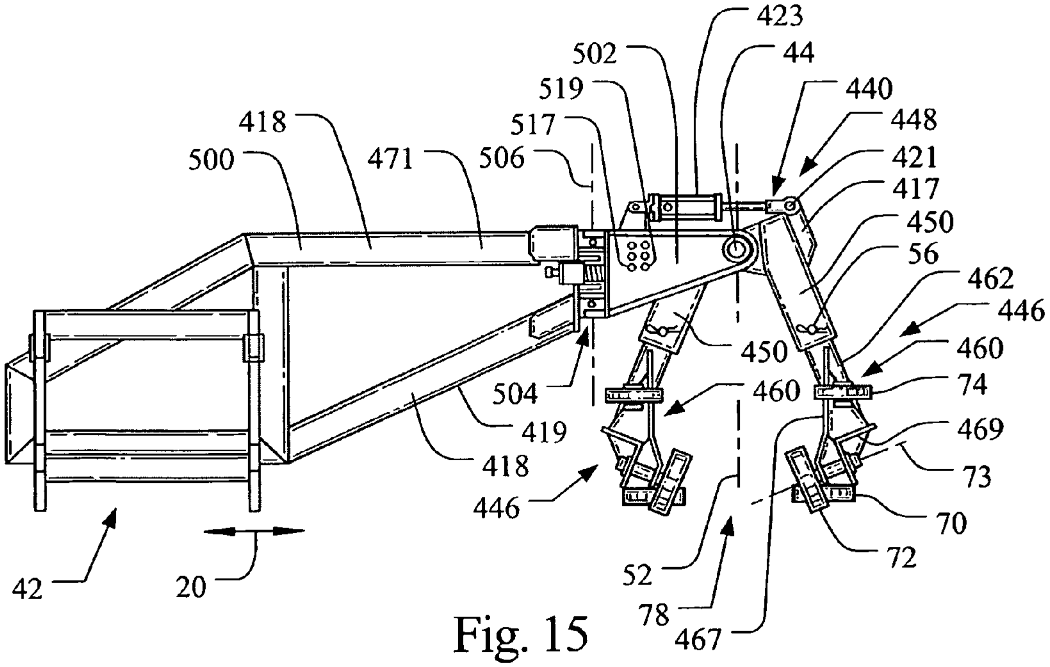
FIG. 15 is a front view of the barrier transfer device shown in FIG. 13.

Referring to FIGS. 1-3, the barrier transfer device 2 is configured with a vehicle interface component 10, shown as two interface plates 12 or frame 412 as shown in FIGS. 13-15, which includes a pair lugs 413 and hooks 415 on each side thereof, which interface with and releasably connect the device to the vehicle. The two interface plates 12 and frame 412 are configured such that the device can be attached to the transfer vehicle with a support arm 18, 418 extending laterally in either direction, depending on the desired direction and path to be taken by the vehicle. In this way, the device is not right or left "handed." In other embodiments, the interface component is provided with a single interface plate such that the device is configured to be coupled in only one of a righthand or left-hand configuration. The interface plates and/or frame are each configured to be easily engaged and coupled to the front end of the vehicle lift mechanism, shown as a pair of lift arms 36 connected with a cross member, which is suited, for example and without limitation, to interface with any number of implements such as buckets, forks, etc.

Figure 4:
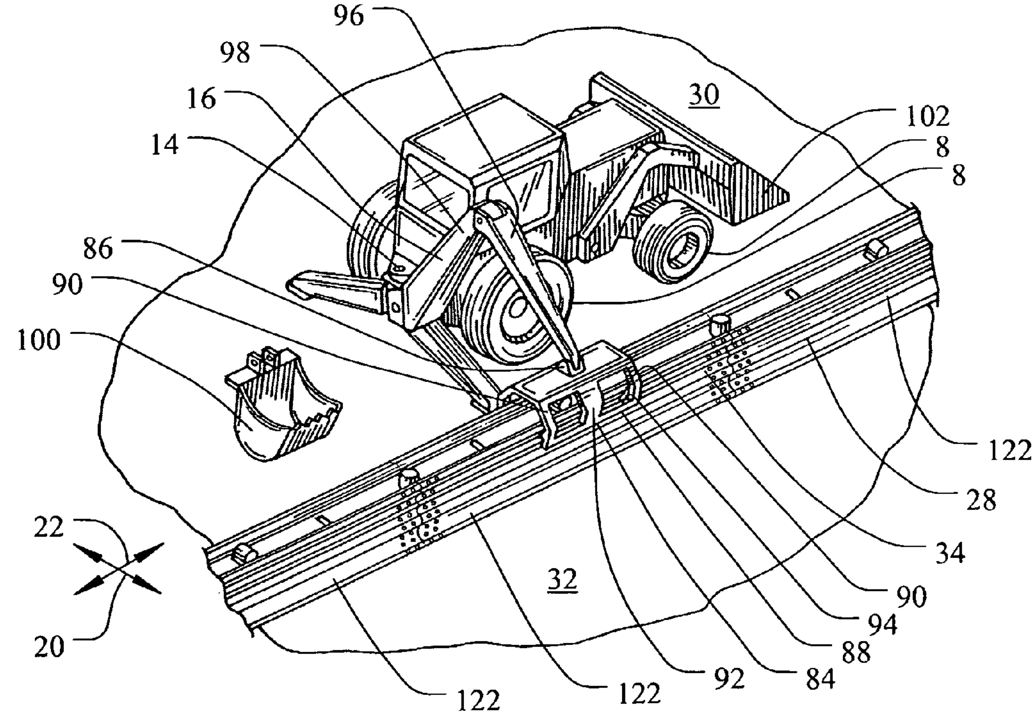
FIG. 4 is a traffic-side perspective view of another embodiment of a barrier transfer device and transfer vehicle, with the device engaged with a barrier.

Referring to the embodiment of FIG. 4, the interface component is configured as a pin 14 or other structure connecting an articulated support arm 16 to the rear of the tractor. Of course, the support arm can also be used in other ways, for example to support and manipulate a load supporting component, such as a bucket 100.

In any of the embodiments shown in FIGS. 1-6 and 13-15, a support arm 16, 18, 418 is cantilevered and extends laterally outwardly from the interface component in a first direction 20, which is substantially perpendicular to a second direction 22 defined by a longitudinal axis of the transfer vehicle running from front to back thereof. The term "cantilevered" refers to a support member being supported at one end (and/or along an intermediate portion thereof) and projecting outwardly and/or upwardly therefrom and carrying a load at the other end. For example, a support member connected to a vehicle, which is further supported by another wheel that directly engages the ground or other surface, is still cantilevered with respect to the vehicle as long as it has a free, unsupported end. It should be understood that the support arm could also extend in the second direction, with the overall direction or position of the support arm defined by the sum of the position vectors in the first and second direction. As shown in FIG. 15, the support arm 418 includes a brace member 419 supporting a horizontal member 471, with the ends of the members 471, 419 meeting and joined, for example with a bracket, or by welding, fasteners and the like. In any event, the support arm 16, 18, 418 extends laterally outwardly past an outermost portion of the transfer vehicle on one side thereof.

Figure 7:
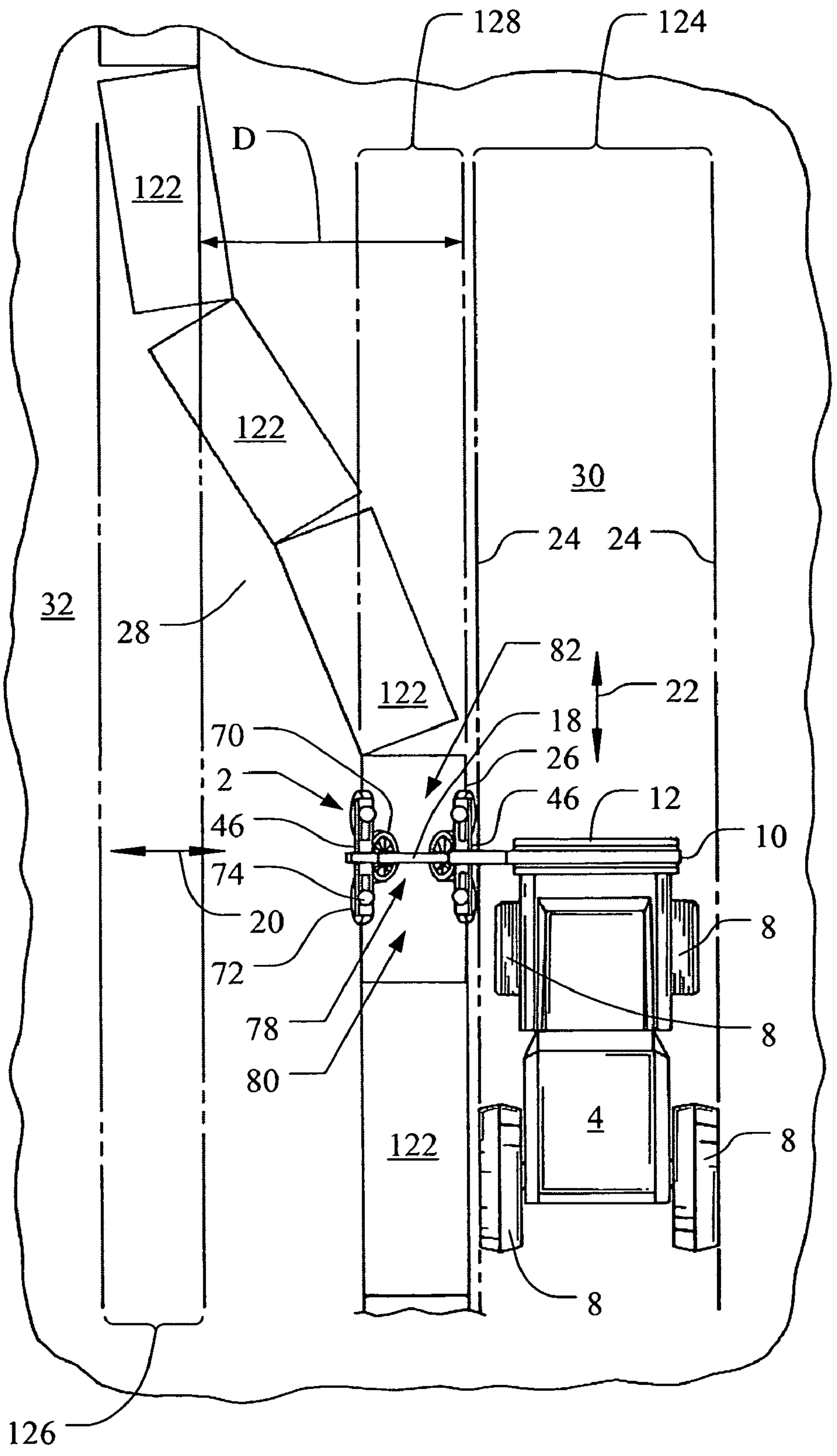
FIG. 7 is a top view of a barrier transfer device and vehicle engaged with a barrier.

For example, as shown in FIGS. 1-4 and 7, the outermost portion is defined by an outer surface of the wheels 8 of the skid-steer loader and tractor. A pair of vertical planes 24 extend in the second direction and pass through the outermost portions on each of a first and second side of the transfer vehicle is shown in FIG. 7. In this way, the transfer vehicle is disposed entirely on a first, "work" side 26 of a barrier 34. In particular, all of the wheels 8 of the transfer vehicle, or other propulsion device or ground engaging structure (outriggers etc.), are disposed entirely on the first side 26 of the barrier and engage the support surface 30 on the first side 26 of the barrier. As such, the vehicle is free of any engagement with the support surface 32 on the second, "traffic" side 28 of the barrier 34. In addition, the operator station is disposed entirely on the work side of the barrier at all times of the barrier transfer.

Figure 5:
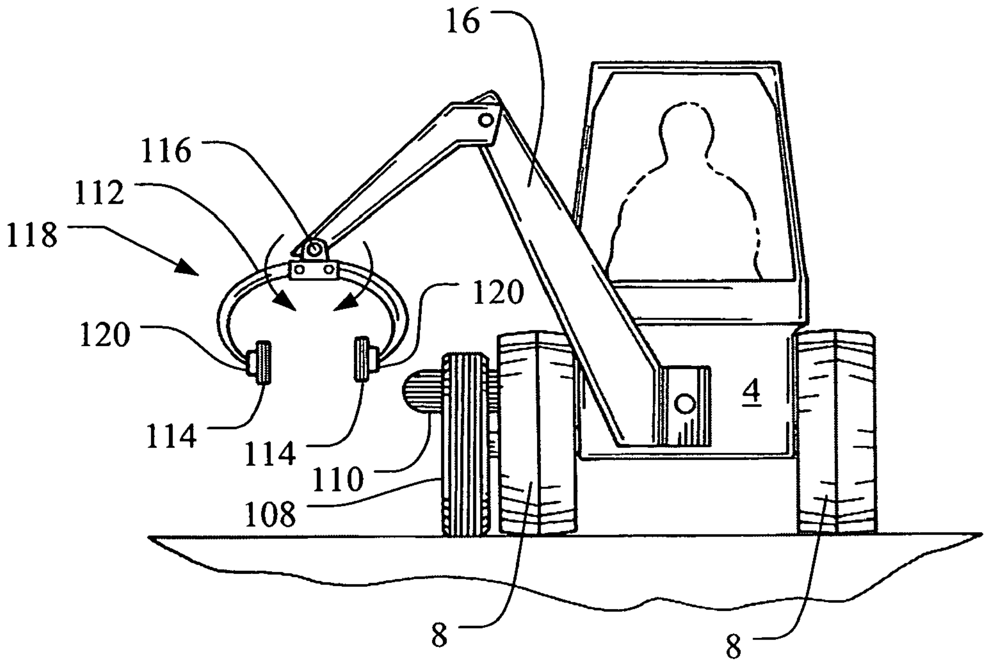
FIG. 5 is a rear view of one embodiment of a barrier transfer device coupled to a transfer vehicle.

As shown in FIGS. 4 and 5, the transfer device includes a support arm 18 that is articulated, while in the embodiment of FIGS. 1-3 and 6, the support arm 16 is fixed or rigid, although it should be understood that the arm can be raised and lowered by actuation of the transfer vehicle lift mechanism 36. In other embodiments, the support arm can be pivotally or translatably (e.g., sliding or telescoping in and out) coupled relative to the transfer vehicle. In various embodiments, the support arm 18 can be made separate from or integral with the interface component 10 and/or the transfer vehicle. It should be understood that the term "coupled" as used herein means connected, whether directly or indirectly, for example by way of an intervening component, and includes components integrally formed as a single unit. Two components can be coupled with mechanical fasteners, welding, bonding, interference fit, tabs, or other known devices, as well as being integrally formed.

A carriage 40, 440 is coupled to a distal, "free" end portion 42 of the support arm 18, 418 which is disposed over a top of the barrier, or to one side thereof. The carriage includes a pair of barrier interface members 46, 446 extending downwardly from the support arm. Again, the carriage can be coupled to the support arm with mechanical fasteners, welding, etc., as well as being integrally formed therewith. When integrally formed, the "end portion" of the arm is considered to be a portion overlying the barrier. In one embodiment, a pin 44 connects the support arm to the carriage. The pin 44 forms a joint that provides a small amount of relative rotation between the carriage and support arm, which facilitates the movement of the barrier. In addition, the pin can be easily removed such that the carriage can be removed.

As shown in FIGS. 13-15, the carriage includes a pair of support arms 450 connected to the end of the support arm 418 with a pin 44. The outboard arm 450 has a lug 417 defining a pivot axis 421 spaced from the axis 419 of pin 44. An actuator 423, configured in one embodiment as an extensible hydraulic or pneumatic actuator, is pivotably connected to the inboard arm at one end, with an extensible piston rod connected to the lug 417 at the other end. The inboard arm 450 is further non-pivotably connected to the support arm 418 at with a pin 517 at one or more of a plurality of support holes 519. In operation, the actuator 423 is extended or retracted so as to pivot the outboard interface member about axis 44, thereby bringing the support arm 450, and associated interface member 446, into and out of engagement with the barrier respectively. In various embodiments, the inboard support arm 450 is non-rotatably fixed relative to the support member 418 about pin 44, or it can also be made pivotable about the pin, and with the pivoting controlled for example by an actuator. Conversely, the outboard support arm and interface member can be non-rotatably fixed, with only the inboard support arm and associated interface member being pivotable. In the embodiment shown, the pin 517 securing the inboard arm 450 to the support arm 418, and the outboard portion 502 in particular, can be removed such that the entire carriage (both arms 450) can be rotated about axis 44 and then fixed in place with pin 517. This macro adjustment of the pivotal location of the carriage can accommodate, or make up for, any tilt that may be present due to the suspension of the transfer vehicle. For example, the transfer device is offset from the center of gravity of the transfer vehicle, or applies a moment thereto, such that that the vehicle tilts toward the barrier side thereof. The macro adjustment device, using pin 517, allows for this tilting to be corrected such that the carriage and arms 450 are properly aligned with the barriers. The operator can then pivot the outboard arm 450 by extending the actuator 423 so as to properly align the carriage arms with the barrier without squeezing the barrier.

Referring to the embodiment of FIG. 3, the carriage 40 includes a yoke 48 that is connected to and supports the barrier interface members. The yoke is preferably an upside down U or V-shape, with a pair of arms 50 extending downwardly from the end portion of the support arm, and outwardly relative to a vertical centerline 52. In the embodiment of FIGS. 13-15, the yoke 448 is configured and formed from the two separate arms 450, one or both of which are joined to the support arm 418 with pin 44. The arms 50, 450 are preferably configured as tubes, with one or more pin holes 54 formed therethrough. Referring to FIGS. 1-3 and 13-15, each barrier interface member 46, 446 includes a support frame 60, 460 having an upwardly extending post 62, 462, preferably formed as a tube. The support frame 60 further includes an inwardly facing base flange 64, a cross member 66 and a pair of angled support members 68.

As shown in FIGS. 13-15, the frame 460 includes a pair of longitudinally extending beams 467, 469, joined to each other with gussets 471 and including further gussets 473 that brace the webs of the beams. The beams and gussets are welded and/or joined with various mechanical fasteners. The beams 469 are configured with an L-shaped cross-section, while beam 467 includes three web portions, with the lower web spaced from a corresponding web of beam 469, and with the combined webs receiving an axle for a wheel 72.

Referring to FIGS. 1-3 and 13-15, preferably, the carriage frame 60, 460, support arm 18, 418 and interface components 10, 412 are made of metal, for example steel or aluminum. The post 62, 462 of each barrier interface member is inserted in or around one of the yoke support arms 50, 450, with a pin 56 releasably securing the post 62, 462 to the arm 50, 450. A plurality of openings 54 are provided in one or both of the post 62, 462 and yoke arm 50, 450 so as to permit a telescoping adjustment of the barrier interface component or member 46, 446 relative to the yoke 48 or pin 44, with a downward adjustment also moving the barrier interface component 46, 446 outwardly relative to the centerline 52 due to the angular orientation of the yoke arm. In addition, one or both of the barrier interface components 46, 446 can be removed to facilitate mounting the carriage 40, 440 on the barrier 34 to be moved. It also may be desirable to provide an inventory of different types of barrier interface components, with different roller assemblies, which are adapted to interface with different types of barriers, such that the releasable attachment of the barrier interface components 46, 446 with a pin 56 provides for easy reconfiguration of the carriage depending on the type of barrier to be moved.

In one embodiment, shown in FIG. 3, each barrier interface component is configured with five interface wheels 70, 72, 74 that interface with the barrier to lift and guide it. The embodiment of FIGS. 13-15 includes seven interface wheels 70, 72, 74. It should be understood that in alternative embodiments, the interface component can be configured with a larger or smaller number of wheels, including for example a single wheel. As shown in FIG. 3, a pair of support wheels 72 is rotatably mounted to the ends of the frame arms 68, while the embodiment of FIG. 13 includes three support wheels 72 rotatably mounted to a longitudinally extending frame 460, with the frame connected to posts 462. In one embodiment, the wheels 72, or rollers, rotate about an axis generally parallel to the surface being engaged with the wheel (i.e., the wheel is generally perpendicular to the surface), although it may be desirable to configure the wheel to engage the surface at an oblique angle, for example to provide additional clearance. In different embodiments, the surface being engaged assumes many different angles relative to a vertical plane, for example the wheels 72 may rotate in a plane formed at an angle of about 22 degrees relative to a vertical plane, and preferably parallel to the support frame, and are rotatable about an axis 73 substantially perpendicular thereto. In one embodiment, the wheels 72 are made for example and without limitation of solid rubber tread on a case iron wheel, while wheels 74 are made for example and without limitation of an elastomer, such as polyurethane. It should be understood that the orientation of the wheels can be altered as desired so as to engage the barrier at a desired location and angle of inclination. For example, the support wheels 72 can be oriented or positioned within a vertical plane and rotatable about a horizontal axis.

In the embodiment of FIGS. 3 and 13, the support wheels 72 engage opposite sides 26, 28 of the barrier, for example the underside of a rib 76 or other protrusion formed along the length of the barrier (shown in FIGS. 1 and 2). The barrier interface component 46, 446 further includes a primary guide wheel 70 rotatably mounted to the base flange 64, or a pair of guide wheels 70 mounted to the frame 468 as shown in FIGS. 13 and 14. In one embodiment, the guide wheels 70 rotate within a plane substantially perpendicular to the plane of the support wheels 72, or as shown in FIG. 15 within a substantially horizontal plane. The spaced apart guide wheels of the opposed barrier interface components engage the sides 26, 28 of the barrier 34 and apply a lateral force thereto so as to facilitate the movement of the barrier in a lateral direction 20. Again, the orientation of the guide wheels can be altered as desired, for example to be rotated within a horizontal plane about a vertical axis (FIG. 15). A pair of auxiliary guide wheels 74 is rotatably mounted to the frame cross member 66 or frame beam 467 and also engage one of the sides 26, 28 of the barrier. The auxiliary guide wheels 74 provide an additional guiding action and prevent the sides of the carriage 40 from scuffing the sides of the barrier 34.

In alternative embodiments, one or more of the support and guide wheels are replaced with a sliding (as opposed to a rolling) interface component. For example, the interface component can be configured with one or more, low coefficient of friction support pads, which slidably engage the barrier as the transfer device is moved relative thereto.

Referring to FIGS. 3, 14 and 15, the barrier interface elements 46, 446 of the carriage are spaced apart in the first direction 20 and define a barrier passageway 78 therebetween. The barrier passageway 78 extends along the second direction 22 and has an inlet 80 and an outlet 82, as best shown in FIGS. 7 and 14. It should be understood that, in one embodiment, the passageway 78 is formed simply by a pair of spaced apart wheels, with the inlet and outlet being defined by the leading and trailing portions of the wheels, and with the wheels engaging the barrier at a tangent thereof between the leading and trailing portions (e.g., along an uppermost surface of the wheel).

Referring to FIGS. 13-16, the support arm 418 includes a first, inboard portion 500 and a second, outboard portion 502, with the first and second portions hingedly connected with a compliant hinge joint 504, such that the second portion can pivot about a substantially vertical axis 506 relative to the first portion. This ability to pivot allows the carriage 440 to align itself with the barrier being moved and prevents the carriage 440 and in particular the interface members 446 from snagging on the barrier. Without the compliant joint, snagging could occur if the carriage, and in particular the passageway formed thereby, were oriented non-parallel or at an angle relative to the barrier the carrier is engaging or about to engage. Snagging can also occur where the direction of travel of the barrier moving vehicle and the orientation of the barrier are not parallel. The compliant hinge joint 504 allows the carriage 440 to self-align with the barrier by rotating the carriage about the axis 506. In addition, the compliant hinge joint helps minimize wear and tear on the wheels 70, 72, 74, since the ability of the carriage 440 to align with the barrier results in more uniform loading on the wheels and as a result, less stress to the wheels.

While the hinge joint 504 is shown as being placed closer to the outboard end of the support arm 418, it should be understood that the hinge joint can be placed elsewhere. For example, the hinge joint can be placed adjacent or closer to the vehicle end of the support arm. Alternatively, the hinge joint could be placed directly over the center of the barrier to minimize torquing effects that snagging could apply to the hinge mechanism.

Figure 17:
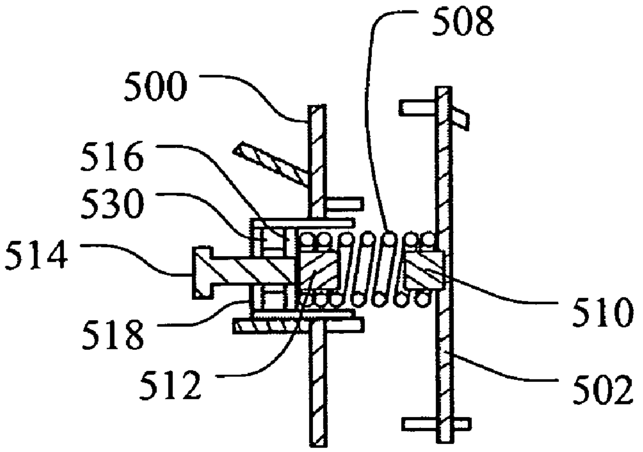
FIG. 17 is a partial cross-sectional view taken along line 17-17 of FIG. 14.

In the current design, torquing effects are minimized by two biasing springs 508 that cause the hinge to be held in a non-deflected position, as shown in FIGS. 13-15 and 17. The springs 508 are positioned on opposite sides of the hinge joint. Rotation of the second portion 502 relative to the first portion, caused for example by a change in the angle of the orientation of the barrier passing through the carriage, causes one spring 508 to be compressed by a small amount and the other spring to be likewise extended by a small amount. The extended spring can either be put in tension, or merely have a portion of any preload relieved. It should be understood that a single spring 508 can be employed, with rotation in one direction (e.g., clockwise) putting the spring in compression and rotation in the other direction (e.g., counter clockwise) putting the spring in tension. Although shown as a helical compression/tension spring, it should be understood that the spring can be configured as a torsion spring, leaf spring or any other type of biasing device suitable to bias the support arms to a nominal position. The nominal preload of the springs is adjusted via a threaded screw 514, which can be tightened or loosened to achieve the desired preload as explained below. In one suitable embodiment, a 5 inch steel spring, with an outside diameter of 2$^{29}/_{32}$ inches, wound from ½ inch wire is used, resulting in a spring rate of 1228 lbs/in. Referring to FIG. 17, each spring 508 is disposed on and between a pair of capture posts 510, 512. The capture posts 510, 512 are slightly smaller than the inside diameter of the spring 508 and their combined length is slightly less than the compressed length of the spring. The first spring capture post 510 is connected to the outboard portion 502 of the support arm, while the second capture post 512 is moveably connected to the inboard portion 500 of the support arm. The second spring capture post 512 is moveably supported in a spring capture bore 516, which is closed on one end with a plate 518 having a hole. A nut 530 is welded to the plate in alignment with the hole, or the plate itself can be threaded. An adjustment screw 514 is threadably engaged with the nut or plate, and rotatably engaged with the spring capture post 512. As the screw 514 is rotated, the spring capture post 512 moves toward or away from the other spring capture post 510 so as to tune the preload on the springs. The pair of springs 508 can be tuned, or preloaded, so as to provide a nominal angular orientation of the outer portion of the support arm relative to the inner portion thereof. The nominal angular orientation can be set at 0 degrees, or can vary from ±12 degrees depending on the relative preloads on each spring. In one embodiment, the adjustment screw is 1 inch in diameter, with 8 threads per inch. The end of the adjustment screw 514 has a small rounded area without threads, which fits into a small bore in the floating spring capture cylinder. In an alternative embodiment, the adjustment screw is rotatably (non-threadably) engaged with the plate, and threadably engaged with the spring capture post. A second, floating nut (not shown) could be added on the adjustment screw on the outside of the adjustment plate. The lock nut would be used to lock the position of the adjustment screw, once the desired preload has been obtained in the spring.

Figure 16:
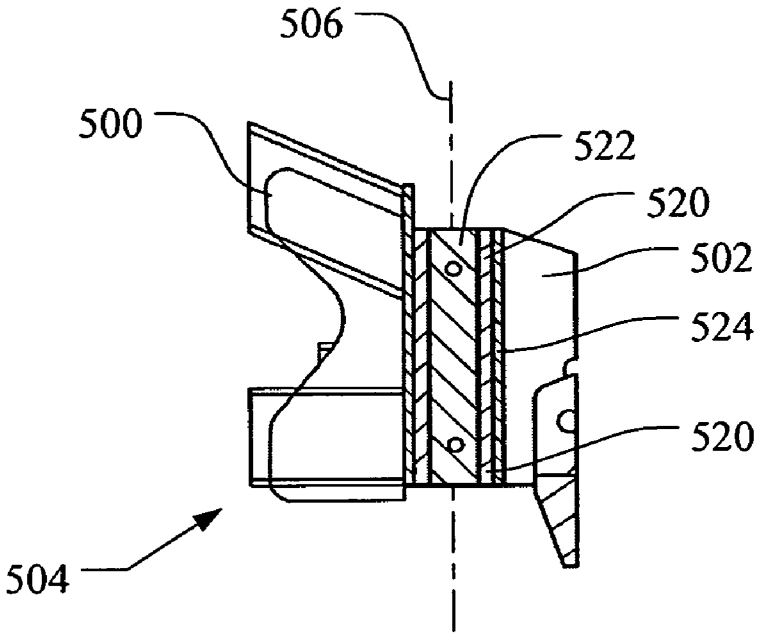
FIG. 16 is a partial cross-sectional view taken along line 16-16 of FIG. 14.

Referring to FIG. 16, a hinge pin 522 engages two outer collars 520 secured to the outer portion 502 of the support arm, and is secured with a pair of cotter pins (not shown.) The hinge pin 522 also passes through a center collar 524 that is mounted to the inboard portion 500 of the support arm. Because of the freedom of movement between the hinge pin and the central collar, a hinge is created, allowing 12 degrees of movement to each side between the outer portion 502 of the arm, where the carriage 440 attaches, and the inner portion 500 of the arm that is attached to the transfer vehicle. Of course, it should be understood that the hinge can be configured to allow greater or lesser relative rotation between the inboard and outboard portions of the support arm.

As shown in FIGS. 4 and 5, the carriage 84 includes a pair of lugs 86 pivotally mounted to an end portion of the support arm 16. The carriage includes a pair of interface elements having a frame with a longitudinally extending support 84 and three arm portions 90, 92. The carriage includes at least one support wheel 94, and preferably at least one guide wheel, which engage the barrier. As referred to above, the support arm 16 shown in FIG. 4 is configured as the articulated arm portion of a conventional backhoe, which includes in one embodiment at least first and second articulated segments 96, 98. In this embodiment, the carriage device is attached to the rear backhoe support arm 16. When the carriage is disconnected from the support arm, a bucket 100, or other load supporting component, can be secured to the support arm such that the backhoe or front-end loader can be used for more conventional tasks. It should be understood that the transfer device can also be attached to the front bucket 102 or in place of the front bucket.

Figure 6:
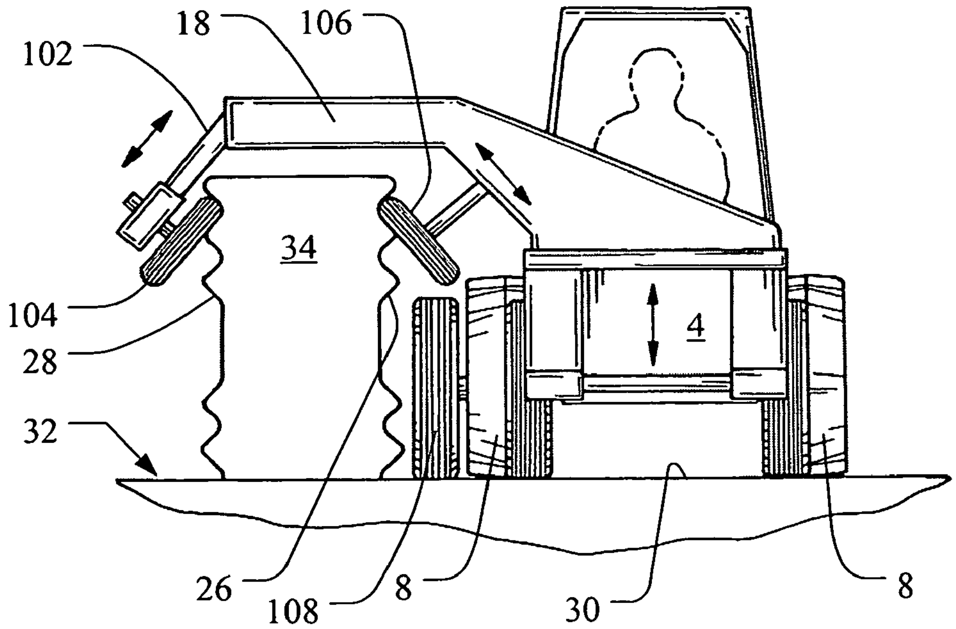
FIG. 6 is a rear view of the barrier transfer device and transfer vehicle shown in FIG. 5, with the barrier transfer device engaged with a barrier.

As shown in FIG. 6, another embodiment of the carriage includes an adjustable, telescoping arm 102 on the traffic side of the barrier. A support wheel 104 is rotatably attached to the arm and engages the barrier. On the work side of the barrier, a support wheel 106 is mounted to the support arm 16. The wheel 106 can be moved along the length of the arm. It should be understood that the arm 102 and wheel 106 in combination form the carriage, even though they are separately connected to the support arm 16. In the embodiments of FIGS. 5 and 6, an outrigger wheel 108 is coupled to the transfer vehicle and is used to support the vehicle and barrier and resist tipping of the transfer vehicle. In addition, an auxiliary guide wheel 110 can be directly mounted to the vehicle, as shown in FIG. 5, again so as to resist tipping of the transfer vehicle.

The arrangement and configuration of the at least one support wheel 72 and at least one guide wheel 70 on the interface component shown in FIG. 3 is suitable for use with the steel Vulcan™ barrier, available from Energy Absorption Systems, the assignee of the present application. Other barriers with different shapes may use a different arrangement of wheels and it should be understood that various barriers, including the Vulcan™ barrier, can be moved using different arrangements of wheels. For example and without limitation, one alternative embodiment is configured with four primary guide wheels and two support/lift wheels, rather that four support/lift wheels and two primary guide wheels. Because of the larger number of primary guide wheels in this embodiment, no auxiliary guide wheels are needed. It should be understood that the transfer device can be configured to move barriers other than steel barriers, including plastic barriers and channelizers, plastic water filled barriers (both empty and full), and concrete barriers. It should be understood, however, that the transfer device is also not limited to moving barriers that provide positive protection, but also can be used to move channelizing devices that are not intended to prevent the intrusion of vehicles into work zones.

In addition, other embodiments of the support arm can be employed. For example, the arm can be made telescopic, with an actuator, e.g., hydraulic, that extends or retracts the arm. Such actuation provides the operator of the transfer vehicle with additional control over the movement of the barrier during operation, and/or of the arm during the initial engagement/set-up.

In another embodiment, shown in FIG. 5, the carriage 118 is configured with pivotable interface elements 112 configured as a clamshell device, with each element having at least one support wheel 114 mounted thereon. In this embodiment, one or both of the interface elements 112 can be pivoted about one or more axes 116 up and away from, or down and toward, the barrier. In this way, the transfer device can be engaged with, and disengaged from, the barrier without the need for the equipment operator to dismount from the transfer vehicle.

The clamshell carriage 118 can also be used to clamp onto individual sections of barrier, or barrier modules 122, to facilitate moving them, for example by lifting. A brake 120 is provided for one or more of the support and guide wheels to prevent relative movement between the wheels 114 and the barrier module 122 during movement thereof.

Figure 8:
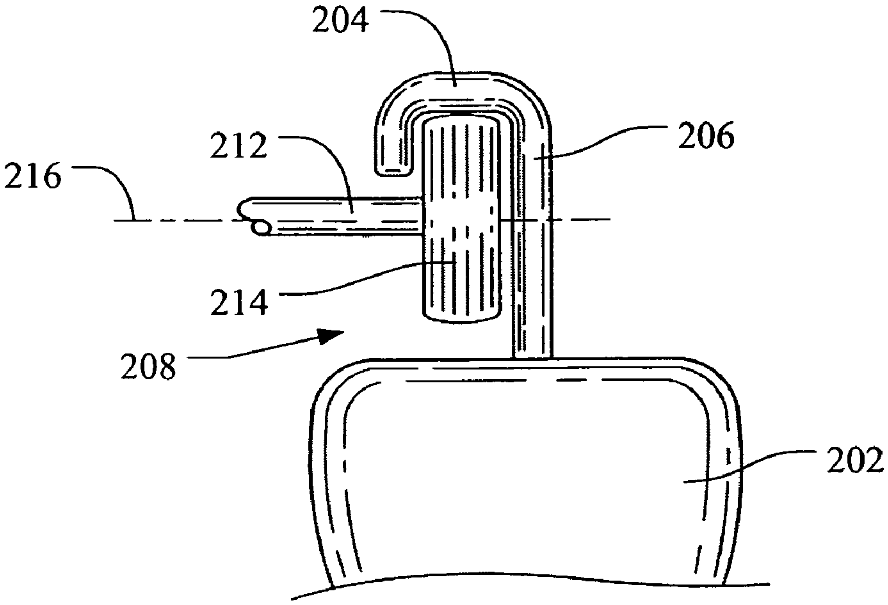
FIG. 8 is a partial end view of a barrier transfer device engaged with a barrier.
Figure 9:
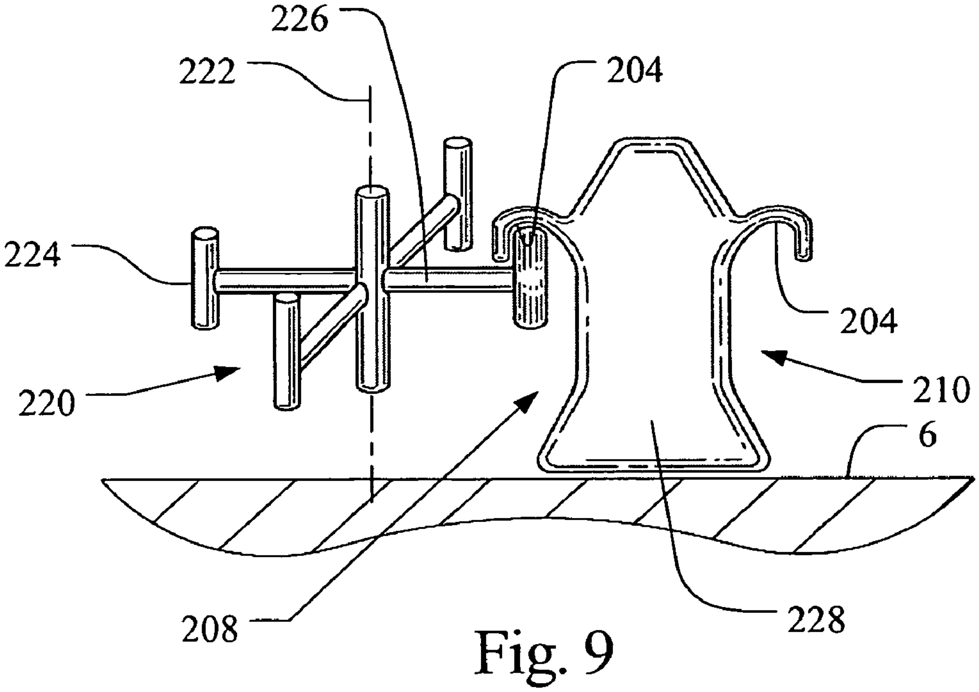
FIG. 9 is a partial end view of a barrier transfer device engaged with a barrier.
Figure 10:
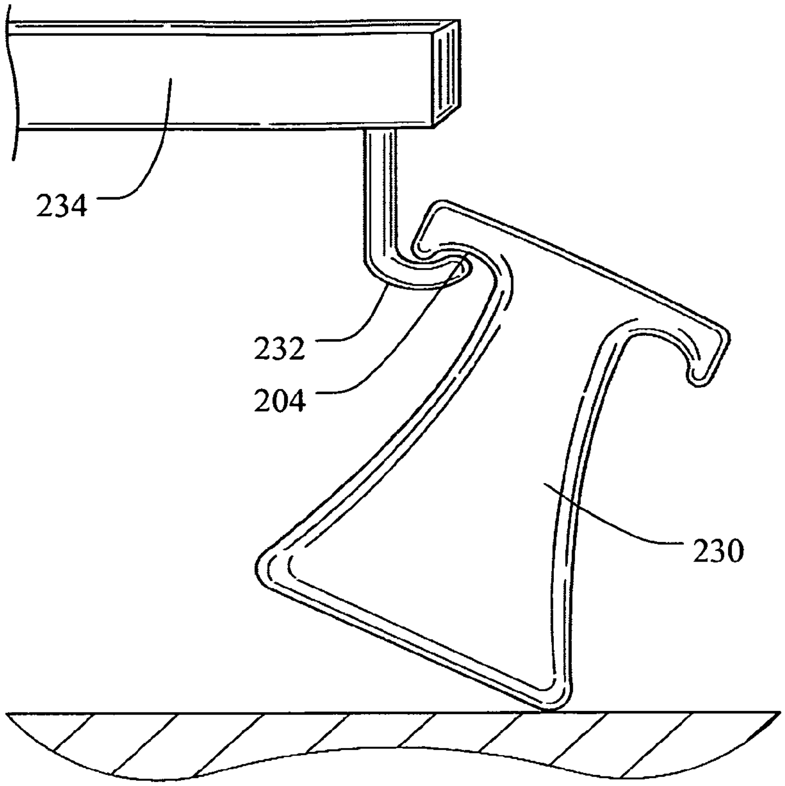
FIG. 10 is a partial end view of a barrier transfer device engaged with a barrier.

Referring to variant embodiments as shown in FIGS. 8-10, the barrier module 202 is configured with a lip 204 (or support surface) on one side 208 of the barrier, with the side configured as a portion of the barrier module facing laterally outwardly in one direction and with the lip/support surface extending or formed with a surface extending outwardly in the same direction. Of course, the barrier could be configured with a lip on both sides of the barrier. Referring to FIG. 8, the lip 204 is formed on an upside down J-shaped interface element configured as a hook 206. It should be understood that lip is formed on the left-hand side 208 of the barrier module shown in FIG. 8, and would be formed on that "side" even if the interface element were positioned all the way to the right of the barrier module. Referring to FIGS. 9 and 10, the barrier module is configured with lips 204 on both sides 208, 210 of the barrier module.

Referring to FIG. 8, a barrier interface element is configured as an axle 212 with a wheel 214 rotatable about an axis 216, shown as a horizontal axis, although other orientations would be suitable depending on the configuration of the lip/support surface. The wheel 214 is shaped to be received under the hook 206 and rotatably engage the lip 204 of the barrier module 228. In this way, the wheel 214 can lift and move the barrier module 202 in a lateral direction. Referring to FIG. 9, the interface element is configured as a rotatable sprocket device 220 that rotates about a vertical axis 222. The interface element is configured with a plurality of engagement members 224 configured on the end of corresponding arms 226. The sprocket device 220 is rotated about the axis 222 such that the engagement members 224 sequentially engage and move the barrier modules 228. The sprocket device also can be configured to lift, at least partially, the barrier module with the sprocket device. Referring to FIG. 10, the transfer device includes a support arm 234 with an interface element configured as a hook element 232 that is shaped to engage and lift the lip 204 of a barrier module 230. In this embodiment, the interface element can lift one or more barrier modules entirely off of the ground, or lift only a portion thereof such that it slides along the ground.

Figure 11:
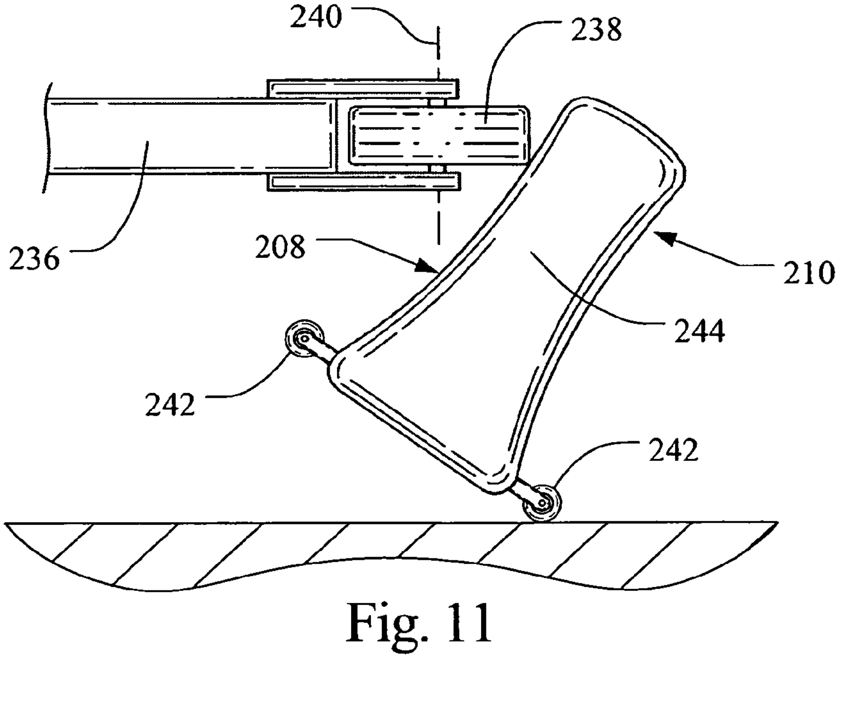
FIG. 11 is a partial end view of a barrier transfer device engaged with a barrier.

Referring to FIG. 11, another embodiment of interface element includes a pusher member 236 that simply engages a side 208 of the barrier module 244 and pushes the barrier laterally. The barrier module 244 can be configured with a wheel 242 on an opposite side 210 of the barrier module, such that, as the barrier module is pushed, the barrier module rotates about a longitudinally extending horizontal axis and then rolls on the wheels 242 to the desired lateral location. Of course, the barrier module 244 can be configured with out wheels, or with a pair of wheels as shown in FIG. 11, which facilitates the laterally movement of the barrier module. The pusher 236 is configured with a wheel 238 rotatable about a vertical axis 240, or any other suitable axis depending on the configuration of the barrier module. The wheel 238 reduces the friction between the interface element and the barrier module, and reduces the chances of scuffing or otherwise damaging the barrier module. Of course, it should be understood that the wheel can be omitted.

Figure 12:
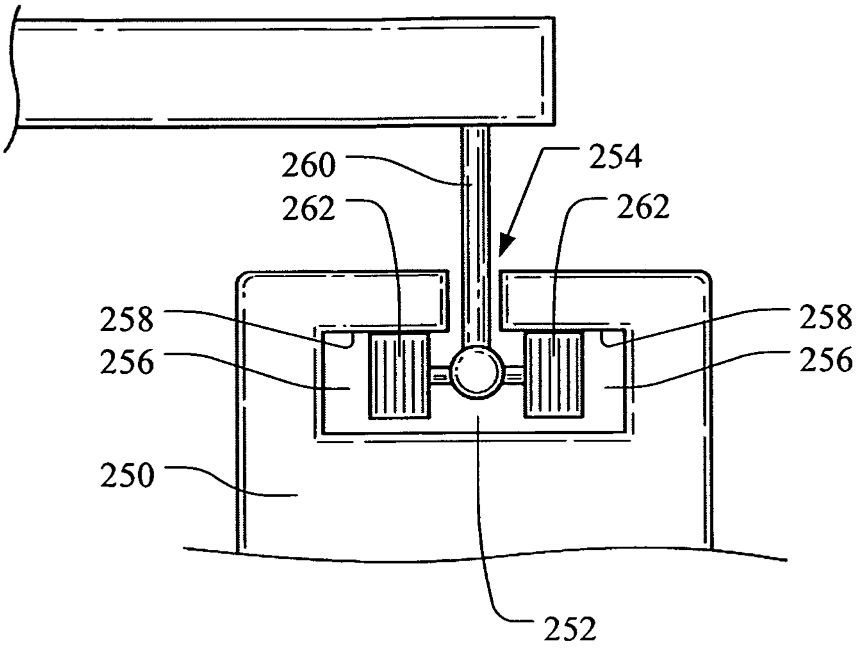
FIG. 12 is a partial end view of a barrier transfer device engaged with a barrier.

Referring to FIG. 12, the barrier module 250 is configured with an upside down T-shaped cavity 252 having a mouth 254 and pair of side cavities 256 defining a pair of engagement surfaces 258. An interface element has an arm portion 260 extending through the mouth 254 and a pair of engagement members 262, preferably but not necessarily configured with rollers or wheels that engage the engagement surfaces 258. The interface element lifts and moves the barrier module laterally.

It should be understood that any of the interface elements shown in FIGS. 8-12 can be suitably coupled to a transfer vehicle, using for example and without limitation a support arm, as described above.

In operation, the transfer device 2 is engaged with a section of the barrier, e.g., an individual barrier module 122. The overall length of the barrier is defined by a plurality of sections or modules 122 arranged and connected end-to-end, for example with pins, as shown in FIGS. 1, 2, 4 and 7. The transfer device can be engaged by way of the clam shell device, or by manually positioning and engaging the interface components. Once the transfer device is engaged with a barrier, the operator simply drives along a desired path 124, offset from the path 126 of the original barrier as shown in FIG. 7. As the transfer vehicle is propelled and directed along the path 124, the transfer device sequentially lifts the barrier modules 122 and moves them laterally a distance "D" to a new path 128. The wheels 70, 72, 74 roll along the sides 26, 28 of the barrier modules so as to permit sequential engagement therewith. As the transfer vehicle 4 moves along the path 124, the modules 122 are sequentially released from the carriage 40, 440.

It should be understood that the term "sequentially" means successively, but is not limited to each barrier module being moved independently of the others when engaged. Rather, due to the interconnection, the lifting and moving of one barrier module will influence and lift and move other connected barriers, especially those in front of the device that are in the original barrier path 126 as opposed to those disposed behind in the new barrier path 128. As such, the term "sequential" merely refers to the barriers being successively engaged, moved and released regardless of whether the engaged barrier module was already moved by way of its interconnection with other modules and regardless of whether other barriers are being moved before being engaged. In addition, it should be understood that the reference to "lifting" the barrier, or a barrier module, does not require that the entirety of the barrier or barrier module be lifted, but rather can also refer to only a portion of the barrier or barrier module being lifted. Of course, the term also includes the lifting of an entirety of the barrier or barrier module, or a plurality of barrier modules together. In one embodiment, the transfer device directly engages a maximum of two barrier modules at any one time, although such engagement may effect a movement of other modules connected thereto.

Referring to FIGS. 8-11, the barrier is engaged on only one side 208 of the barrier. The barrier can be lifted (partially or entirely) off of the ground support surface and moved laterally. If only lifted partially, the transfer device then pushes the barrier laterally sideways, with the barrier sliding or rolling (if configured with wheels) on the ground. It should be understood that in most embodiments, the barrier can be pushed or pulled, i.e., moved laterally in either direction, by the transfer device. In other embodiments, for example as shown in FIG. 11, the barrier 244 can only be pushed in one direction, with the vehicle then having to operate on the other side to push the barrier back.

The system provides for a low-cost mechanism that can be quickly installed and deployed and thereafter used to quickly move a barrier 34 laterally in a work zone. In addition, the lateral distance (D) of movement or travel of the barrier is defined simply by the path 124 of the transfer vehicle relative to the original path 126 of the barrier, thereby allowing the operator to move the barriers laterally more or less depending on the particular configuration of the work zone. In various embodiments, the barrier is infinitely, laterally adjustable. In one embodiment, the barrier can be moved up to 20 feet in one pass, up to about 15 feet in another embodiment, up to 12 feet in another embodiment or up to 6 feet in another embodiment, or any distance less than such a designated maximum, depending on the configuration of the transfer vehicle and barrier. For example, the compliant hinge joint 504 of the embodiment shown in FIGS. 13-17 allows for an increase in amount of lateral movement that can be achieved, for example from about 8 feet to about 13 feet. If it is desired to move the barrier an additional amount, the operator simply makes one or more additional passes, in the same or opposite direction (e.g., with the transfer device extending from an opposite side of the vehicle), so as to move the barrier to the final desired destination or path 128. The transfer device is low cost, extremely portable, and easily stored on-site with minimum spatial requirements. Moreover, as previously explained, the transfer device can be easily attached to commonly available construction equipment.

As also noted, the transfer vehicle 4 does not straddle the barrier, so it does not require support wheels on both sides of the barrier. This means that the device poses a much lower risk to passing vehicles, enhancing the safety of both the work crews and the passing motorists. In addition, by coupling the transfer device 2 at the front end of the transfer vehicle 4, for example when using a tractor or skid-steer loader, the operator is positioned behind the portion of the barrier that is being moved. As such, the operator is able to directly observe the movement of the barrier and control its motion much more easily, all while being protected on the work side of the barrier. Of course, it should be understood that an additional support wheel can be provided to extend from the transfer device and engage the ground on a side of the barrier opposite the transfer vehicle if desired. In addition, if desired, for example because of spatial constraints (e.g., an adjacent trench or ditch) or other reasons (e.g., unidirectional moving capability of transfer device), the transfer vehicle can be operated on the "traffic" side of the barrier and move the barrier toward or away from the "work" side.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A barrier transfer device comprising:

a vehicle interface component adapted to be mounted to a transfer vehicle;

a cantilever support arm coupled to said vehicle interface component, wherein said cantilever support arm extends laterally outwardly in at least a first direction from said vehicle interface component; and a carriage coupled to said support arm, said carriage comprising at least a pair of barrier interface members extending downwardly from said support arm, wherein said barrier interface members are spaced apart in said first direction and define a barrier passageway therebetween, said barrier passageway having an inlet and an outlet, wherein said barrier passageway extends between said inlet and said outlet in a second direction substantially perpendicular to said first direction, wherein said barrier interface members are configured to engage a barrier on opposite sides thereof when the barrier is disposed in the barrier passageway.

2. The barrier transfer device of claim 1 wherein said vehicle interface component comprises an interface plate.

3. The barrier transfer device of claim 1 wherein said support arm comprises at least first and second articulated segments.

4. The barrier transfer device of claim 1 wherein each of said at least said pair of barrier interface members comprises at least one support wheel adapted to support at least a portion of the barrier above the ground and at least one guide wheel adapted to guide the barrier through the barrier passageway.

5. The barrier transfer device of claim 1 wherein each of said barrier interface members comprises a telescoping post.

6. The barrier transfer device of claim 5 wherein said carriage comprises a yoke coupled to said support arm, and wherein each of said telescoping posts is telescopically coupled to said yoke.

7. The barrier transfer device of claim 6 wherein said posts each form an oblique angle relative to a vertical plane.

8. The barrier transfer device of claim 1 wherein said vehicle interface component comprises an engagement system adapted to releasably mount said vehicle interface component to the transfer vehicle.

9. The barrier transfer device of claim 1 wherein said support arm includes a first portion pivotally connected to a second portion about a substantially vertical axis.

10. A system for transferring a barrier comprising:

a transfer vehicle having an outermost portion on each of first and second opposite sides of said transfer vehicle;

a cantilever support arm coupled to said transfer vehicle, wherein said cantilever support arm extends laterally outwardly past said outermost portion of said transfer vehicle on said first side of said transfer vehicle; and a carriage coupled to said support arm, said carriage comprising at least a pair of barrier interface members extending downwardly from said support arm, wherein said barrier interface members are spaced apart and define a barrier passageway therebetween, wherein said barrier passageway has an inlet and an outlet, wherein said inlet and said outlet are positioned laterally outwardly of said outermost portion of said transfer vehicle on said first side of said transfer vehicle, and wherein said barrier interface members are configured to engage a barrier on opposite sides of the barrier as the barrier passes through the barrier passageway from said inlet to said outlet.

11. The barrier transfer device of claim 10 wherein said support arm includes a first portion pivotally connected to a second portion about a substantially vertical axis.

12. The system of claim 10 wherein said barrier passageway is substantially linear between said inlet and said outlet.

13. The system of claim 10 wherein said transfer vehicle is a skid-steer loader.

14. The system of claim 10 wherein said transfer vehicle is a front-end loader.

15. The system of claim 10 wherein said support arm is releasably secured to said transfer vehicle.

16. The system of claim 15 wherein said support arm is releasably secured to said transfer vehicle with a vehicle interface component.

17. The system of claim 10 wherein said support arm comprises at least first and second articulated segments.

18. The system of claim 10 wherein each of said at least said pair of barrier interface members comprises at least one support wheel adapted to support at least a portion of the barrier above the ground and at least one guide wheel adapted to guide the barrier through the barrier passageway.

19. The system of claim 10 wherein each of said barrier interface members comprises a telescoping post.

20. The system of claim 10 further comprising the barrier.

21. The system of claim 20 wherein said barrier comprises a steel frame.

22. A barrier transfer device comprising:

a vehicle interface component adapted to be mounted to a transfer vehicle;

a cantilever support arm comprising a first portion coupled to said vehicle interface component, wherein said first portion of said cantilever support arm extends laterally outwardly in at least a first direction from said vehicle interface component, and wherein said cantilever support arm further comprises a second portion pivotally connected to said first portion about a substantially vertical axis, wherein said second portion is pivotable relative to said first portion from a nominal position to a deflected position;

at least one spring biasing said second portion relative to said first portion from said deflected position toward said nominal position; and a carriage coupled to said second portion of said support arm, said carriage comprising at least a pair of opposing barrier interface members configured to engage a barrier on opposite sides thereof, wherein said barrier interface members are moveable toward and away from each other to engage the barrier on opposite sides thereof.

23. The barrier transfer device of claim 22 comprising a pair of springs positioned on opposite sides of said vertical axis.

24. The barrier transfer device of claim 22 wherein said at least one spring has a substantially horizontal orientation.

25. The barrier transfer device of claim 22 further comprising an adjustment device coupled to said at least one spring, wherein said adjustment device is operable to adjust the biasing force of said at least one spring.

* * * * *